(12) United States Patent
Zhang

(10) Patent No.: US 10,691,283 B2
(45) Date of Patent: Jun. 23, 2020

(54) DISPLAY SCREEN, MOBILE TERMINAL HAVING DISPLAY SCREEN, METHOD AND DEVICE FOR CONTROLLING DISPLAY SCREEN WITH IMPROVED PROPORTION OF DISPLAY AREA

(71) Applicant: Guangdong Oppo Mobile Telecommunications Corp., Ltd., Dongguan, Guangdong (CN)

(72) Inventor: Haiping Zhang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 15/853,250

(22) Filed: Dec. 22, 2017

(65) Prior Publication Data
US 2018/0260079 A1 Sep. 13, 2018

(30) Foreign Application Priority Data

Mar. 7, 2017 (CN) .......................... 2017 1 0132551

(51) Int. Cl.
*G06F 3/041* (2006.01)
*G06F 3/0481* (2013.01)
(Continued)

(52) U.S. Cl.
CPC .......... *G06F 3/0481* (2013.01); *G06F 1/1641* (2013.01); *G06F 1/1652* (2013.01);
(Continued)

(58) Field of Classification Search
CPC .... G09G 2360/14; G09G 3/20; G06F 3/0481; G06F 1/1641; G06F 1/1652;
(Continued)

(56) References Cited

U.S. PATENT DOCUMENTS

| | | | |
|---|---|---|---|
| 2007/0002130 A1* | 1/2007 | Hartkop | H04N 7/141 348/14.16 |
| 2008/0106591 A1* | 5/2008 | Border | H04N 7/144 348/14.01 |

(Continued)

FOREIGN PATENT DOCUMENTS

| | | |
|---|---|---|
| CN | 202889422 U | 4/2013 |
| CN | 103676257 A | 3/2014 |

(Continued)

OTHER PUBLICATIONS

International Search Report issued in corresponding international application No. PCT/CN2017/116397 dated Feb. 23, 2018.
(Continued)

*Primary Examiner* — Adam J Snyder
(74) *Attorney, Agent, or Firm* — Young Basile Hanlon & MacFarlane, P.C.

(57) ABSTRACT

A display screen, a mobile terminal having the display screen, a method and device for controlling the display screen are provided. The display screen includes a display panel. The display panel includes an active area and a functional area. The active area is configured to display information. The functional area is operable in a first mode for displaying the information or a second mode for allowing light to pass through.

18 Claims, 7 Drawing Sheets

(51) Int. Cl.
    *H04M 1/02*      (2006.01)
    *H04M 1/725*     (2006.01)
    *G06F 1/16*      (2006.01)
    *G06F 3/0488*    (2013.01)
    *H04N 7/14*      (2006.01)
    *G09G 3/20*      (2006.01)
    *G06F 3/14*      (2006.01)

(52) U.S. Cl.
    CPC .......... *G06F 1/1677* (2013.01); *G06F 3/0488* (2013.01); *H04M 1/0264* (2013.01); *H04M 1/0266* (2013.01); *H04M 1/725* (2013.01); *H04M 1/72569* (2013.01); *G06F 3/1415* (2013.01); *G09G 3/20* (2013.01); *H04M 1/026* (2013.01); *H04M 1/72563* (2013.01); *H04M 2250/52* (2013.01); *H04N 7/144* (2013.01); *H04N 2007/145* (2013.01)

(58) Field of Classification Search
    CPC .... G06F 1/1677; G06F 3/0488; G06F 3/1415; H04M 1/725; H04M 1/0264; H04M 1/0266; H04M 1/72569; H04M 1/026; H04M 1/72563; H04N 7/144
    USPC .......................................................... 345/207
    See application file for complete search history.

(56) References Cited

U.S. PATENT DOCUMENTS

| | | | |
|---|---|---|---|
| 2009/0009628 A1 | 1/2009 | Janicek | |
| 2009/0102763 A1* | 4/2009 | Border | H04N 7/144 345/87 |
| 2011/0279689 A1* | 11/2011 | Maglaque | H04N 5/2253 348/207.1 |
| 2012/0258773 A1* | 10/2012 | Alvarez Rivera | G06F 1/1656 455/556.1 |
| 2013/0135238 A1 | 5/2013 | Naccache et al. | |
| 2013/0135328 A1* | 5/2013 | Rappoport | G06F 3/0481 345/522 |
| 2013/0182062 A1* | 7/2013 | Son | H04N 7/144 348/14.07 |
| 2013/0328842 A1* | 12/2013 | Barnhoefer | G06F 3/044 345/207 |
| 2015/0049165 A1* | 2/2015 | Choi | H04N 7/144 348/14.16 |
| 2017/0084231 A1* | 3/2017 | Chew | G06F 1/1626 |
| 2017/0092228 A1* | 3/2017 | Cote | G09G 3/3225 |
| 2017/0123452 A1* | 5/2017 | Evans, V | G02F 1/133305 |
| 2017/0123575 A1* | 5/2017 | Evans, V | G06F 3/041 |
| 2017/0124932 A1* | 5/2017 | Evans, V | H04N 7/144 |
| 2017/0160766 A1* | 6/2017 | Gupta | G06F 1/1605 |
| 2018/0129328 A1* | 5/2018 | Park | G09G 3/20 |
| 2018/0274974 A1* | 9/2018 | Wang | G01J 1/00 |

FOREIGN PATENT DOCUMENTS

| | | |
|---|---|---|
| CN | 103941977 A | 7/2014 |
| CN | 104049839 A | 9/2014 |
| CN | 104834353 A | 8/2015 |
| CN | 205921628 U | 2/2017 |
| CN | 106850897 A | 6/2017 |
| EP | 2778831 A1 | 9/2014 |
| TW | M305913 U | 2/2007 |
| WO | 2017052777 A1 | 3/2017 |

OTHER PUBLICATIONS

Search report and written opinion issued in corresponding Singapore application No. 11201907906P dated Feb. 25, 2020.
Examination Report No. 1 issued in corresponding Australian application No. 2017402495 dated May 1, 2020.

* cited by examiner

DISPLAY SCREEN, MOBILE TERMINAL HAVING DISPLAY SCREEN, METHOD AND DEVICE FOR CONTROLLING DISPLAY SCREEN WITH IMPROVED PROPORTION OF DISPLAY AREA

CROSS-REFERENCE TO RELATED APPLICATION(S)

This application claims priority to Chinese Patent Application No. 201710132551.7, filed on Mar. 7, 2017, the contents of which is herein incorporated by reference in its entirety.

TECHNICAL FIELD

The present disclosure relates to terminal technologies, and more particularly, to a display screen, a mobile terminal having the display screen, a method and device for controlling the display screen.

BACKGROUND

With rapid development of mobile terminal technologies, mobile terminals become more and more popular, and serve as essential equipment in people's lives. People can learn or entertained with mobile terminals.

Currently, a mobile terminal typically has a display screen including a display area and a non-display area located above the display area. The non-display area has the same width as the display area. The non-display area is mainly used to define through holes for disposing a camera, a microphone, a sensor, and so on. Hence, the width of the non-display area cannot be too small, and the proportion of the display area is not high.

DETAILED DESCRIPTION

Figure 1:
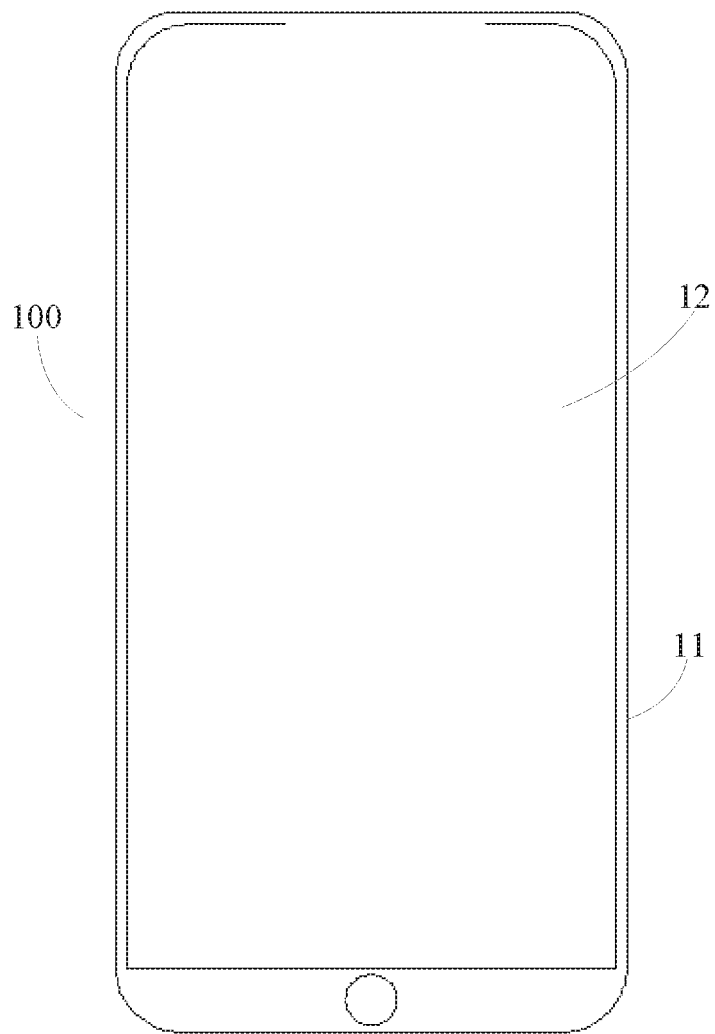
FIG. 1 is a front view of a mobile terminal according to an implementation of the present disclosure.

Reference is made to the drawings in which identical or similar reference numerals represent identical or similar parts, and principles of the present disclosure are illustrated by implementation in a scenario. The following description is based on the illustrated implementations of the present disclosure and should not be construed as a limitation on other implementations of the present disclosure which are not detailed herein.

The term "implementation" as used in the description is intended to refer to an example, embodiment, or illustration. In addition, the article "a", "an" as used in the description and the appended claims may generally be construed as "one or more", unless otherwise specified or otherwise clearly contradicted by context.

In the description of the present disclosure, it should be understood that orientational or positional relationships indicated by the terms "central", "longitudinal", "transverse", "length", "width", "thickness", "upper", "lower", "front", "back", "left", "right", "vertical", "horizontal", "top", "bottom", "inside", "outside", "clockwise", "counterclockwise", and the like are those as illustrated in the accompanying drawings, and are merely for facilitating and simplifying the description of the present disclosure, rather than indicating or implying that the mentioned devices or elements should have specific orientations and should be constructed and operated in specific orientations, and thus cannot be construed as a limit on the present disclosure.

In the present disclosure, unless specified otherwise, the terms "mount", "connect", "couple", and the like should be broadly understood, and may refer to, for example, an undetachable connection, a detachable connection, or an integral connection, or may refer to a mechanical connection, an electrical connection, or mutual communication, or may refer to a direct connection, an indirect connection via an intermediate medium, or a communication between two elements or an interaction relationship between two elements. For persons skilled in the art, the specific meaning of the foregoing terms in the present disclosure should be understood in light of the specific circumstance.

In the present disclosure, unless specified otherwise, a first feature being "on" or "beneath" a second feature may mean that the first feature may be in direct contact with the second feature, or the first feature may be in indirect contact with the second feature via an intermediate medium. Moreover, the first feature being "on", "over" or "above" the second feature may mean that the first feature is over or above the second feature, or merely mean that the first feature has a horizontal level higher than the second feature. The first feature being "beneath", "under" or "below" the second feature may mean that the first feature is under or below the second feature, or merely mean that the first feature has a horizontal level lower than the second feature.

Many different implementations or examples for achieving different structures of the present disclosure are provided hereinafter. To simplify the present disclosure, the components and arrangements of specific examples are described below. These components and arrangements are merely exemplary, and are not to be construed as a limit on the present disclosure. In addition, the reference numerals and/or letters may be repeated in the different examples of the present disclosure. Such repetition is for the purpose of simplification and clarity, without indicating relationships between the discussed various implementations and/or arrangements. Moreover, the present disclosure provides examples of various specific processes and materials, but the application of other processes and/or use of other materials may also occur to persons skilled in the art.

A mobile terminal according to an implementation of the present disclosure is described hereinafter, and for convenience of description, only parts relating to implementations of the present disclosure are illustrated.

Figure 3:
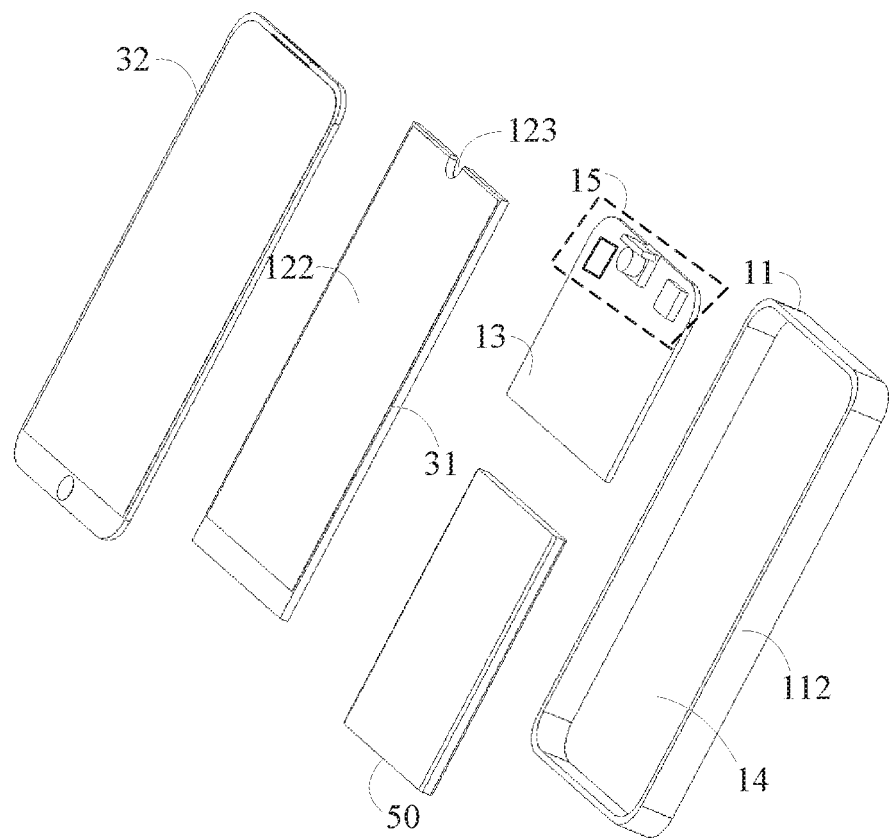
FIG. 3 is a schematic exploded view of a mobile terminal according to an implementation of the present disclosure.

FIG. 1 is a front view of a mobile terminal 100 according to an implementation of the present disclosure and FIG. 3 is a schematic exploded view of the mobile terminal 100 according to an implementation of the present disclosure. The mobile terminal 100 as illustrated in FIG. 1 is a smart phone, however, the mobile terminal of the present disclosure may also be a terminal having a display screen, such as a tablet computer, a notebook computer, and a personal digital assistant (PDA).

As illustrated in FIG. 1 and FIG. 3, the mobile terminal 100 includes a housing 11, a display screen 12, a printed circuit board 13, and a functional assembly 15. The housing 11 and the display screen 12 enclose a receiving space 14 in which the printed circuit board 13 and the functional assembly 15 are received.

Figure 4:
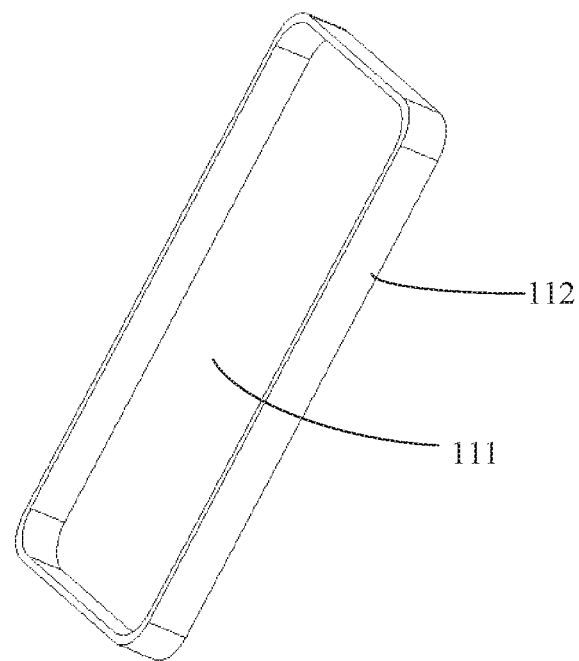
FIG. 4 is a schematic structural view of a housing of a mobile terminal according to an implementation of the present disclosure.

FIG. 4 is a schematic structural view of the housing 11 of the mobile terminal 100 according to an implementation of the present disclosure. As illustrated in FIG. 4, the housing 11 includes a bottom plate 111 and a side frame 112 extending from the periphery of the bottom plate 111 in a direction perpendicular to the bottom plate 111. In at least one implementation, the functional assembly 15 is disposed on the bottom plate 111.

The housing 11 may be made of at least one of plastic material, ceramic material, and metallic material.

The display screen 12 is configured to display an electronic file such as an image, a video, or a text. The display screen 12 is electrically connected to the printed circuit board 13.

As illustrated in FIG. 3, the mobile terminal 100 may further include a battery 50. The display screen 12 may be electrically connected to the printed circuit board 13 via a flexible printed circuit board.

Figure 2:
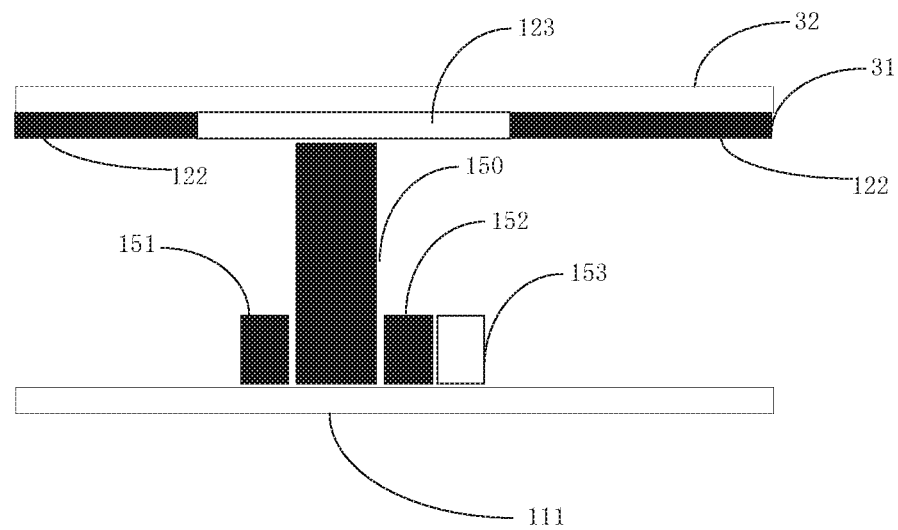
FIG. 2 is a cross-sectional view of a mobile terminal according to an implementation of the present disclosure.

FIG. 2 is a cross-sectional view of a mobile terminal according to an implementation of the present disclosure. In at least one implementation, as illustrated in FIG. 2 and FIG. 3, the functional assembly 15 may include a camera 150, a proximity sensor, and an ambient light sensor 153. The functional assembly 15 is electrically connected to the printed circuit board 13.

In at least one implementation, the functional assembly 15 includes at least one selected from a group consisting of the camera 150, the proximity sensor, and the ambient light sensor 153.

In the present implementation, the proximity sensor may include a light emitter 151 configured to emit light to the outside and a light receiver 152 configured to receive the light emitted by the light emitter 151 and reflected by an external object.

In at least one implementation, the light emitter 151 may be an infrared emitter such as an infrared light emitting diode (IR LED) configured to emit infrared light to the outside, while the light receiver 152 may be an infrared receiver configured to receive infrared light.

In at least one implementation, the light emitter 151 may be a laser emitter configured to emit a laser to the outside while the light receiver 152 may be a laser receiver configured to receive the laser.

In at least one implementation, the light receiver 152 of the proximity sensor may further be integrated with the ambient light sensor 153, i.e., the light receiver 152 of the proximity sensor and the ambient light sensor 153 may be integrated in one module. In this way, the module can not only receive invisible light (such as the infrared light) emitted by the light emitter 151, but also receive visible light from the outside.

In at least one implementation, the light receiver 152 and the ambient light sensor 153 may be disposed separately and independently of each other. In at least one implementation, the light receiver 152 and the ambient light sensor 153 are connected to each other, such as arranged side by side.

Actually, the proximity sensor can determine whether the mobile terminal 100 is close to a user's face by detecting the light emitted by the light emitter 151 and reflected by the user's face, when the mobile terminal 100 is in communication. The backlight of the display screen 12 may be turned off when the mobile terminal 100 is close to the user's face, thereby reducing power consumption and preventing misoperation.

The ambient light sensor 153 can sense ambient light when the ambient light passes through the display screen 12. The brightness of the display screen 12 may be adjusted according to the intensity of the ambient light sensed by the ambient light sensor 153.

As illustrated in FIG. 2 and FIG. 3, the display screen 12 includes a display panel 31 configured to display information and a cover plate 32 covering the display panel 31. The cover plate 32 is made from transparent material and protects the display panel 31. The user can perform gesture operations (such as tapping or swiping) on the surface of the cover plate 32, so as to control the mobile terminal to achieve the corresponding function.

As illustrated in FIG. 3, the display panel 31 includes an active area 122 and a functional area 123. In at least one implementation, the functional area 123 is adjacent to the active area 122. The active area 122 is configured to display the information, while the functional area 123 is configured to display the information or be transparent.

The functional area 123 is configured to display the information, when operating in a first mode (display mode). On the other hand, the functional area 123 is configured to transparent to allow the light to pass through, when operating in a second mode (functional mode).

In at least one implementation, the functional area 123 is disposed at the top or bottom of the display panel 31. In at least one implementation, the functional area 123 is disposed in the middle of the top or bottom of the display panel 31. In at least one implementation, the functional area 123 is disposed at the edge of the display panel 31, and the continuity of the displayed information is not destroyed, since generally the edge of the display panel 31 may not display the information.

As illustrated in FIG. 3, the functional area 123 has a semicircular shape.

Figure 5:
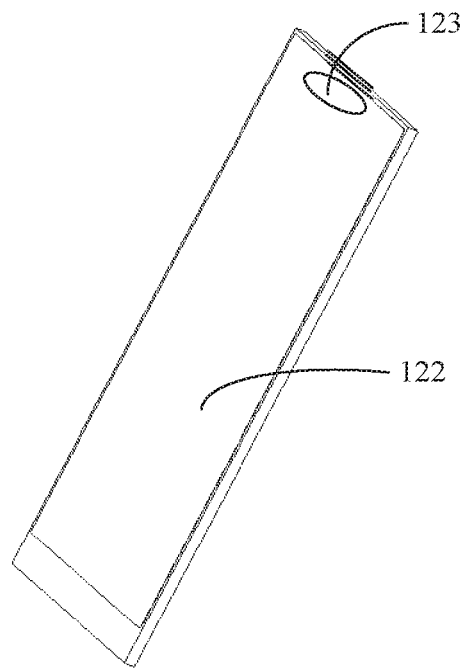
FIG. 5 is a schematic structural view of a display panel of a mobile terminal according to an implementation of the present disclosure.

FIG. 5 is another schematic structural view of the display panel 31 of a mobile terminal 100 according to an implementation of the present disclosure. In at least one implementation, as illustrated in FIG. 5, the functional area 123 is surrounded by the active area 122 and has an elliptical shape, but the present disclosure is not limited to it. In at least one implementation, the functional area 123 may have a rectangular shape with rounded corners, a square shape with rounded corners, a circular shape, or the like. These shapes can effectively improve the aesthetic appeal of the mobile terminal 100.

The functional assembly 15 is disposed under the functional area 123. The functional area 123, when operating in the first mode, is configured to display the information together with the active area 122. On the other hand, the functional area 123, when operating in the second mode, is configured to be transparent to allow the functional assembly 15 to emit and receive the light through the transparent functional area 123.

In at least one implementation, the functional area 123 operating in the first mode is configured to display one or more thumbnails corresponding to the information displayed in the active area 122, or the functional area 123 operating in the first mode is configured to display the information together with the active area 122.

The functional area 123 has an area greater than or equal to that of the functional assembly 15. In at least one implementation, the area of the functional area 123 is greater than or equal to the sum of the areas of the camera 150, the proximity sensor, and the ambient light sensor 153. Therefore, when the functional area 123 operates in the first mode, the display panel 31 may not keep the camera from capturing external images, and may not keep the proximity sensor and the ambient light sensor from emitting and receiving the light through the functional area 123.

In at least one implementation, when the mobile terminal 100 activates the camera 150, the functional area 123 is configured to be transparent, and the functional area 123 serves as a transparent area such that the camera 150 can capture external images through the transparent functional area 123.

In at least one implementation, when the mobile terminal 100 is in communication, the functional area 123 is configured to be transparent, and the functional area 123 serves as a transparent area such that the proximity sensor can emit and receive the light through the transparent functional area 123 so as to determine the distance between the mobile terminal 100 and the external object reflecting the light.

In at least one implementation, when the mobile terminal 100 activates the ambient light sensor 153, the functional area 123 is configured to be transparent, and the functional area 123 serves as a transparent area such that the ambient light sensor 153 can sense the ambient light through the transparent functional area 123 so as to adjust the brightness of the display screen 12 according to the ambient light.

The functional area 123 and the active area 122 may be made from different materials. Hence, the active area 122 is configured to merely display the information, while the functional area 123 is configured to display the information or be transparent. Thus, when the functional area 123 operates in the first mode, the functional area 123 is configured to display the information together with the active area 122; when the functional area 123 operates in the second mode, the functional area 123 is configured to be transparent such that the functional assembly 15 can emit and receive the light through the transparent functional area 123.

In at least one implementation, the active area 122 is a liquid crystal display panel while the functional area 123 is a transparent display panel. Hence, when the functional area 123 needs not to display the information, the functional area 123 is configured to be transparent to allow the functional assembly 15 to emit and receive the light through the transparent functional area 123; on the other hand, when the functional area 123 needs to display the information, the information to be displayed in the functional area 123 is output to the functional area 123.

As seen from the above, according to the mobile terminal of the present disclosure, the display screen includes the display panel including the active area and the functional area; when the functional area operates in the first mode, the functional area is configured to display the information together with the active area; when the functional area operates in the second mode, the functional area is configured to be transparent such that the functional assembly can emit and receive the light through the transparent functional area. Hence, through holes may not be defined in the display screen, thereby enabling the whole display screen to display the information; furthermore, the functional area can allow the light to pass through, thereby effectively improving the proportion of the display area and effectively improving the aesthetic appeal of the mobile terminal.

Figure 6:
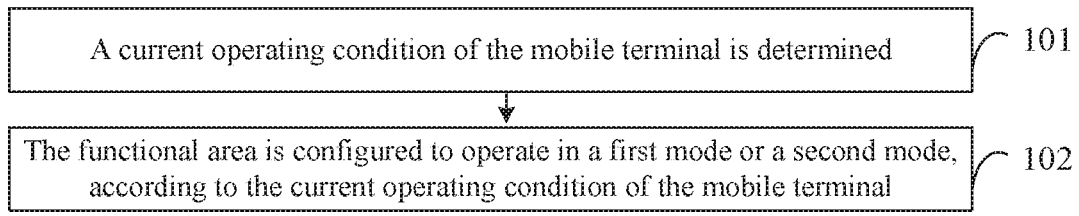
FIG. 6 is a flowchart of a method for controlling a display screen according to an implementation of the present disclosure.

FIG. 6 is a flowchart of a method for controlling a display screen according to an implementation of the present disclosure. The method is applicable in the mobile terminal 100 as illustrated in FIGS. 1 to 5. As illustrated in FIG. 6, the method may begin at block 101.

At block 101: a current operating condition of the mobile terminal is determined.

At block 102: the functional area is configured to operate in a first mode or a second mode, according to the current operating condition of the mobile terminal.

In at least one implementation, when the functional area operates in the first mode, the functional area is configured to display information; when the functional area operates in the second mode, the functional area is configured to be transparent to allow a functional assembly to emit and receive light through the transparent functional area.

In at least one implementation, the active area is a liquid crystal display panel while the functional area is a transparent display panel. Hence, when the functional area needs not to display the information, the functional area is configured to be transparent to allow the functional assembly to emit and receive the light through the transparent functional area; on the other hand, when the functional area needs to display the information, the information to be displayed in the functional area is output to the functional area.

Figure 7:
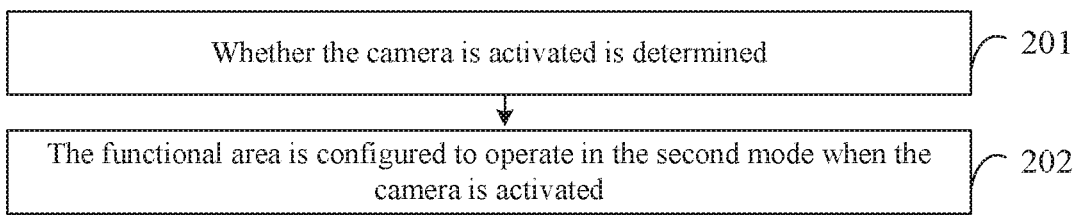
FIG. 7 is a flowchart of a method for controlling a display screen according to another implementation of the present disclosure.

FIG. 7 is a flowchart of a method for controlling a display screen according to another implementation of the present disclosure. The method is applicable in a mobile terminal having a camera and a display screen. The display screen includes a display panel including an active area and a functional area. The camera is disposed under the functional area. As illustrated in FIG. 7, the method may begin at block 201.

At block 201: whether the camera is activated is determined.

At block 202: the functional area is configured to operate in the second mode when the camera is activated, such that the camera can capture external images through the transparent functional area.

Figure 8:
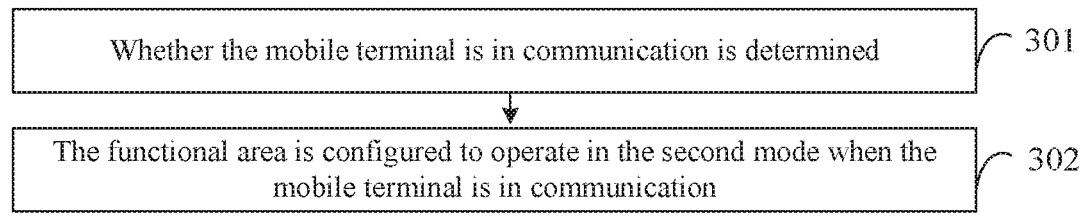
FIG. 8 is a flowchart of a method for controlling a display screen according to yet another implementation of the present disclosure.

FIG. 8 is a flowchart of a method for controlling a display screen according to yet another implementation of the present disclosure. The method is applicable in a mobile terminal having a proximity sensor and a display screen. The display screen includes a display panel including an active area and a functional area. The proximity sensor is disposed under the functional area. As illustrated in FIG. 8, the method may begin at block 301.

At block 301: whether the mobile terminal is in communication is determined.

At block 302: the functional area is configured to operate in the second mode when the mobile terminal is in communication, such that the proximity sensor can emit and receive light through the transparent functional area so as to determine the distance between the mobile terminal and an external object reflecting the light.

Figure 9:
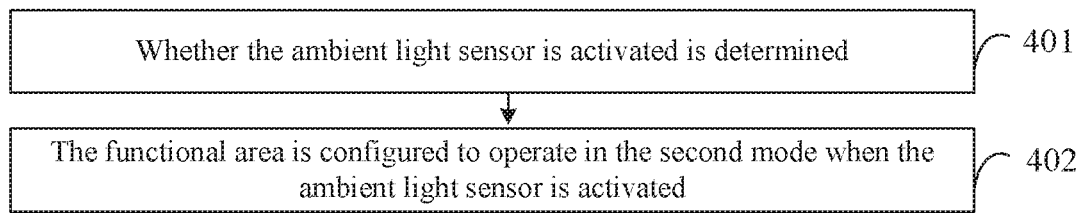
FIG. 9 is a flowchart of a method for controlling a display screen according to still another implementation of the present disclosure.

FIG. 9 is a flowchart of a method for controlling a display screen according to still another implementation of the present disclosure. The method is applicable in a mobile terminal having an ambient light sensor and a display screen. The display screen includes a display panel including an active area and a functional area. The ambient light sensor is disposed under the functional area. As illustrated in FIG. 9, the method may begin at block 401.

At block 401: whether the ambient light sensor is activated is determined.

At block 402: the functional area is configured to operate in the second mode when the ambient light sensor is activated, such that the ambient light sensor can sense ambient light through the transparent functional area so as to adjust the brightness of the display screen according to the ambient light.

Figure 10:
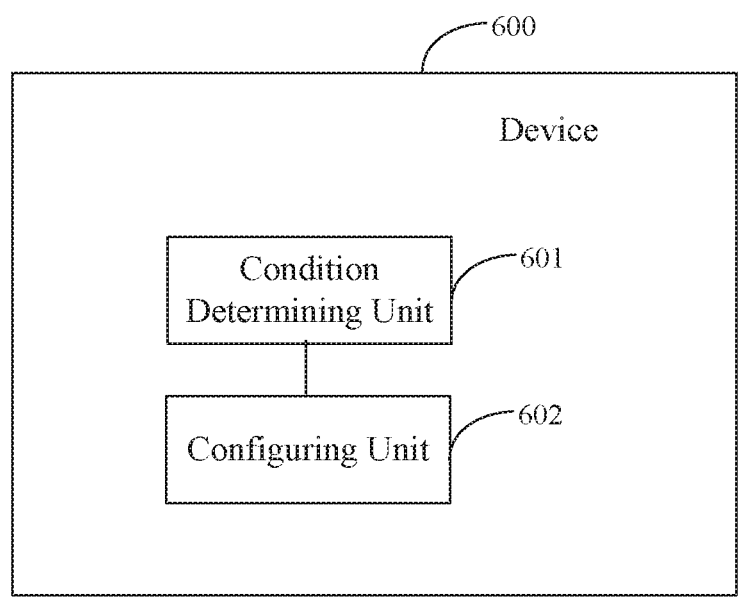
FIG. 10 is a schematic structural diagram of a device for controlling a display screen according to an implementation of the present disclosure.

FIG. 10 is a schematic structural diagram of a device 600 for controlling a display screen according to an implementation of the present disclosure. For convenience of description, only parts relating to implementations of the present disclosure are illustrated. The device 600 may be software, hardware, or a combination of software and hardware in a mobile terminal having the display screen. The display screen includes a display panel including an active area and a functional area. As illustrated in FIG. 10, the device 600 includes a condition determining unit 601 and a configuring unit 602.

The condition determining unit 601 is configured to determine a current operating condition of the mobile terminal.

The configuring unit 602 is configured to configure the functional area to operate in a first mode or a second mode, according to the current operating condition of the mobile terminal.

Figure 11:
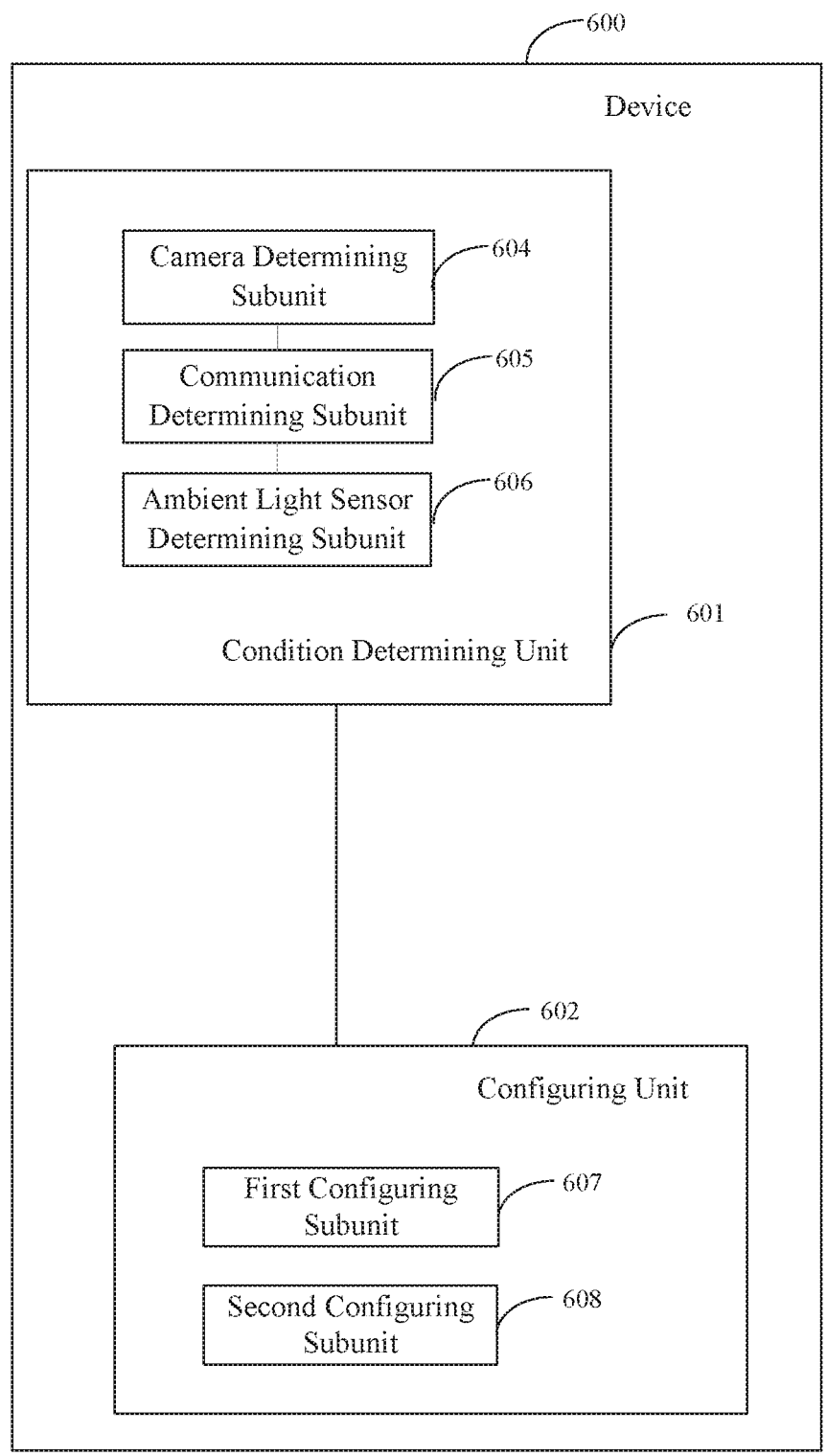
FIG. 11 is a schematic structural diagram of a device for controlling a display screen according to another implementation of the present disclosure.

FIG. 11 is a schematic structural diagram of a device for controlling a display screen according to another implementation of the present disclosure. As illustrated in FIG. 11, the configuring unit 602 includes a first configuring subunit 607 and a second configuring subunit 608.

The first configuring subunit 607 is configured to configure the functional area to operate in the first mode for displaying information.

The second configuring subunit 608 is configured to configure the functional area to operate in the second mode for allowing a functional assembly to emit and receive light through the transparent functional area.

In at least one implementation, when the mobile terminal further has a camera disposed under the functional area, the condition determining unit 601, as illustrated in FIG. 11, includes a camera determining subunit 604.

The camera determining subunit 604 is configured to determine whether the camera is activated.

The second configuring subunit 608 is configured to configure the functional area to operate in the second mode when the camera is activated such that the camera can capture external images through the functional area.

In at least one implementation, when the mobile terminal further has a proximity sensor disposed under the functional area, the condition determining unit 601, as illustrated in FIG. 11, includes a communication determining subunit 605.

The communication determining subunit 605 is configured to determine whether the mobile terminal is in communication.

The second configuring subunit 608 is configured to configure the functional area to operate in the second mode when the mobile terminal is in communication, such that the proximity sensor can emit and receive the light through the transparent functional area so as to determine the distance between the mobile terminal and an external object reflecting the light.

In at least one implementation, when the mobile terminal further has an ambient light sensor disposed under the functional area, the condition determining unit 601, as illustrated in FIG. 11, includes an ambient light sensor determining subunit 606.

The ambient light sensor determining subunit 606 is configured to determine whether the ambient light sensor is activated.

The second configuring subunit 608 is configured to configure the functional area to operate in the second mode when the ambient light sensor is activated, such that the ambient light sensor can sense ambient light through the transparent functional area so as to adjust the brightness of the display screen according to the ambient light.

Figure 12:
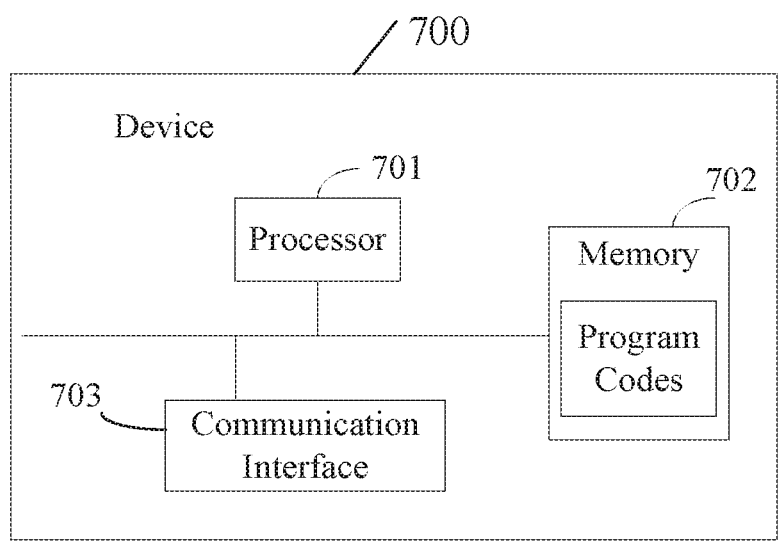
FIG. 12 is a schematic structural diagram of a device for controlling a display screen according to yet another implementation of the present disclosure.

FIG. 12 is a schematic structural diagram of a device 700 for controlling a display screen according to yet another implementation of the present disclosure. As illustrated in FIG. 12, the device 700 includes at least one processor 701, at least one computer-readable non-volatile memory 702, and at least one communication interface 703. The memory 702 and the communication interface 703 are electrically and communicatively connected to the processor 701.

The processor 701 may be a general-purpose central processing unit (CPU), a microprocessor, an application-specific integrated circuit (ASIC), or one or more integrated circuits.

The memory 702 may include a read-only memory (ROM) and other types of static memories capable of storing static information and instructions, a random access memory (RAM) and other types of dynamic memories capable of storing dynamic information and instructions, an electrically erasable programmable read-only memory (EEPROM), a compact disc read-only memory (CD-ROM) and other optical disks (including a compact disc, a laser disc, a digital versatile disc (DVD), a blue-ray disc, and so on), a magnetic storage memory and other magnetic storage media, and any other storage media which are configured to store at least one program in the form of instructions or data structures and can be accessed by a computer, but is not limited to them. The memory 702 can be disposed independently and electrically connected to the processor 701 via the communication bus. In at least one implementation, the memory 702 can also be integrated with the processor 701.

The communication interface 703 is configured to communicate with other devices or communication networks, such as Ethernet, a radio access network (RAN), a wireless local area network (WLAN), and the like.

The memory 702 is configured to store the at least one program executed by the processor 701. The processor 701 is configured to execute the at least one program stored in the memory 702 to perform the methods described with reference to FIGS. 6 to 9.

In summary, a display screen, a mobile terminal having the display screen, a method and device for controlling the display screen are provided by the present disclosure. The display screen includes an active area configured to display the information and a functional area configured to display the information or be transparent. A functional assembly is disposed under the functional area. The functional area, when operating in the first mode, is configured to display the information together with the active area. On the other hand, the functional area, when operating in the second mode, is configured to be transparent to allow the functional assembly to emit and receive light through the transparent functional area. Hence, through holes may not be defined in the display screen, thereby enabling the whole display screen to display the information; furthermore, the functional area can allow the light to pass through, thereby effectively improving the proportion of the display area and effectively improving the aesthetic appeal of the mobile terminal.

Although the present disclosure has been illustrated and described with respect to a certain implementation or implementations, certain equivalent alterations and modifications will occur to persons skilled in the art upon the reading and understanding of this description and the accompanying drawings. The present disclosure includes all such alterations and modifications, and is limited only by the scope of the appended claims. In particular regard to the various functions performed by the above described components, the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary implementations of the present disclosure. In addition, while a particular feature of the present disclosure may have been disclosed with respect to only one of several implementations, such feature may be combined with one or more features of the other implementations as may be desired and advantageous for any given or particular application. Furthermore, to the extent that the terms "including", "includes", "having", "has", "with", or variants thereof are used in the description or the claims, such terms are intended to be inclusive in a manner similar to the term "comprising".

In conclusion, although the present disclosure is described by way of the implementations, they are not intended to limit the present disclosure. Persons skilled in the art can make various variations and improvements without departing from the spirit and scope of the present disclosure. Therefore, the protection scope of the present disclosure is subject to the scope defined in the claims.

What is claimed is:

1. A display screen, comprising:
a display panel, the display panel comprising:
an active area configured to display information; and
a functional area covering a camera together with a proximity sensor and an ambient light sensor of a mobile terminal having the display panel, an area of the functional area being greater than or equal to a sum of areas of the camera, the proximity sensor, and the ambient light sensor, the functional area being operable in a first mode for displaying the information or a second mode to be transparent for allowing light to pass therethrough according to a current operating condition of the mobile terminal, wherein the proximity sensor, the camera, and the ambient light sensor are disposed under the functional area on a bottom plate of a housing of the mobile terminal, wherein the housing houses the proximity sensor, the camera, and the ambient light sensor therein, the bottom plate is opposite to the display screen, and when the functional area is transparent, the mobile terminal selectively allows the camera, the proximity sensor, or the ambient light sensor to operate corresponding to the current operating condition of the mobile terminal,
wherein the proximity sensor comprises a light emitter configured to emit the light and a light receiver configured to receive the light emitted by the light emitter and reflected by an external object,
wherein the light emitter, the camera, the light receiver, and the ambient light sensor are disposed at the bottom plate side by side, and
wherein the light emitter and the light receiver are disposed at opposite sides of the camera, and the ambient light sensor is disposed at a side of the light receiver away from the camera.

2. The display screen of claim 1, wherein the functional area is adjacent to the active area.

3. The display screen of claim 1, wherein the functional area is surrounded by the active area.

4. The display screen of claim 1, wherein the functional area is disposed at the top or bottom of the display panel.

5. The display screen of claim 1, wherein the display screen further comprises a cover plate covering the display panel, and the cover plate is made from transparent material.

6. The display screen of claim 1, wherein the functional area and the active area are made from different materials.

7. A mobile terminal, comprising:
a display screen, wherein the display screen comprises a display panel, the display panel comprises an active area and a functional area, and the active area is configured to display information; and
a camera together with a proximity sensor and an ambient light sensor disposed under the functional area and on a bottom plate of a housing that is opposite to the display screen, wherein an area of the functional area is greater than or equal to a sum of areas of the camera, the proximity sensor, and the ambient light sensor, wherein the housing houses the proximity sensor, the camera, and the ambient light sensor therein, and the functional area is operable in a first mode for displaying the information or a second mode to be transparent for allowing light passing therethrough according to a current operating condition of the mobile terminal, and when the functional area is transparent, the mobile terminal selectively allows the camera, the proximity sensor, or the ambient light sensor to operate corresponding to the current operating condition of the mobile terminal,
wherein the proximity sensor comprises a light emitter configured to emit the light and a light receiver configured to receive the light emitted by the light emitter and reflected by an external object,
wherein the light emitter, the camera, the light receiver, and the ambient light sensor are disposed at the bottom plate side by side, and
wherein the light emitter and the light receiver are disposed at opposite sides of the camera, and the ambient light sensor is disposed at a side of the light receiver away from the camera.

8. The mobile terminal of claim 7, wherein the functional area is adjacent to the active area.

9. The mobile terminal of claim 7, wherein the functional area is surrounded by the active area.

10. The mobile terminal of claim 7, wherein the functional area is disposed at the top or bottom of the display panel.

11. The mobile terminal of claim 7, wherein the display screen further comprises a cover plate covering the display panel, and the cover plate is made from transparent material.

12. The mobile terminal of claim 7, wherein the functional area and the active area are made from different materials.

13. The mobile terminal of claim 7, wherein the light receiver of the proximity sensor and the ambient light sensor are integrated in one module.

14. The mobile terminal of claim 7, wherein the light receiver and the ambient light sensor are disposed separately and independently of each other.

15. A method for controlling a display screen of a mobile terminal, comprising:
   determining a current operating condition of the mobile terminal, wherein the display screen comprises a display panel, and the display panel comprises an active area and a functional area, a camera together with a proximity sensor and an ambient light sensor of the mobile terminal are disposed under the functional area, an area of the functional area being greater than or equal to a sum of areas of the camera, the proximity sensor, and the ambient light sensor;
   configuring the functional area to operate in a first mode or a second mode according to the current operating condition of the mobile terminal, wherein the proximity sensor, the camera, and the ambient light sensor are disposed under the functional area and on a bottom plate of a housing of the mobile terminal, wherein the housing houses the proximity sensor, the camera, and the ambient light sensor therein, and the bottom plate is opposite to the display screen; and
   selectively allowing the camera, the proximity sensor, or the ambient light sensor to operate corresponding to the current operating condition of the mobile terminal,
   wherein the proximity sensor comprises a light emitter configured to emit the light and a light receiver configured to receive the light emitted by the light emitter and reflected by an external object,
   wherein the light emitter, the camera, the light receiver, and the ambient light sensor are disposed at the bottom plate side by side, and
   wherein the light emitter and the light receiver are disposed at opposite sides of the camera, and the ambient light sensor is disposed at a side of the light receiver away from the camera.

16. The method of claim 15, wherein determining the current operating condition of the mobile terminal comprises:
   determining whether the ambient light sensor is activated;
   configuring the functional area to operate in the first mode or the second mode comprises:
   configuring the functional area to operate in the second mode when the ambient light sensor is activated; and
   selectively allowing the camera, the proximity sensor, or the ambient light sensor to operate according to the current operating condition of the mobile terminal, comprises:
   allowing the ambient light sensor to sense ambient light through the functional area so as to adjust brightness of the display screen according to the ambient light.

17. The method of claim 15, wherein:
   determining the current operating condition of the mobile terminal comprises determining whether the camera is activated;
   configuring the functional area to operate in the first mode or the second mode comprises configuring the functional area to operate in the second mode when the camera is activated; and
   selectively allowing the camera, the proximity sensor, or the ambient light sensor to operate according to the current operating condition of the mobile terminal, comprises allowing the camera to capture external images through the functional area.

18. The method of claim 15, wherein:
   determining the current operating condition of the mobile terminal comprises determining whether the mobile terminal is in communication;
   configuring the functional area to operate in the first mode or the second mode comprises configuring the functional area to operate in the second mode when the mobile terminal is in communication; and
   selectively allowing the camera, the proximity sensor, or the ambient light sensor to operate according to the current operating condition of the mobile terminal comprises allowing the proximity sensor to emit and receive the light through the functional area so as to determine a distance between the mobile terminal and an external object reflecting the light.

* * * * *